350-96.18 SR
XR 3,770,910

United State
Rose et al.

[11] 3,770,910
[45] Nov. 6, 1973

[54] APPARATUS FOR RECORDING SOUND ON MICROFICHE

[76] Inventors: Charles R. Rose, 5710 Harbord Dr., Oakland, Calif. 94611; George E. Artiano, 5622 Maxwelton Rd., Oakland, Calif. 94618

[22] Filed: Apr. 21, 1972

[21] Appl. No.: 246,356

[52] U.S. Cl. .. 179/100.3 B, 178/DIG. 2, 178/6.7 R, 350/96 B

[51] Int. Cl. .......................... G11b 7/12, H04m 5/84

[58] Field of Search ........... 179/100.3 B, 100.2 MD, 179/100.2 T; 178/6.7 R, 6.7 A, 6.6 A, DIG. 2; 350/96 B; 250/219 Q, 219 QA, 219 FT, 219 D, 219 FR, 227

[56] References Cited

UNITED STATES PATENTS

| | | | |
|---|---|---|---|
| 1,746,407 | 2/1930 | Schroter et al. | 178/6.7 R |
| 3,325,594 | 6/1967 | Goldhammer et al. | 250/227 X |
| 3,562,422 | 2/1971 | McMann | 178/6.7 A |
| 3,255,357 | 6/1966 | Kapany et al. | 250/219 QA |
| 3,621,133 | 11/1971 | Baker | 178/DIG. 2 |
| 3,198,881 | 8/1965 | Knocklein | 178/6.7 A |
| 3,240,106 | 3/1966 | Hicks | 178/DIG. 2 |
| 3,569,616 | 3/1971 | Baker | 178/DIG. 2 |
| 3,314,075 | 4/1967 | Becker | 178/6.7 R |
| 2,648,589 | 8/1953 | Hickman | 179/100.2 T |
| 3,167,612 | 1/1965 | Strickholm | 350/96 B |

*Primary Examiner*—Raymond F. Cardillo, Jr.
*Attorney*—James R. Cypher

[57] ABSTRACT

An apparatus consisting briefly of a laser means for generating a beam of coherent electromagnetic radiation a record disc player or magnetic tape player for producing a signal to be recorded, a modulator for receiving the beam and the signal; an extinction control operatively connected to the modulator; a member having a slit therein for passing the modulated beam, a circular to linear scanner consisting of optic fibers; a recording member in microfiche format and apparatus for moving the recording member during the recording process.

1 Claim, 8 Drawing Figures

3770910
OR IN 179/100.3B

PATENTED NOV 6 1973 3,770,910

SHEET 1 OF 3

APPARATUS FOR RECORDING SOUND ON MICROFICHE

BACKGROUND OF THE INVENTION

For many years, optical sound reproduction means have been used to record the sound tracks on the films used by commercial theaters. These sound tracks have not been of the high fidelity achieved by magnetic tapes and are therefore limited in use. Further, present optical sound reproduction has only been used on reel to reel film.

Thus far, magnetic tape is still dependent upon moving an elongated strip of tape from one reel across a head to another reel. The use of tapes presents a storage problem for persons with extensive libraries. More importantly, the use of relatively inexpensive recording equipment has made it all too easy for many people to record their own magnetic tapes from radio programs or from one reel to another, thus in many cases defeating the rights of copyright holders by making illegal copies without a license and depriving composers, recording artists and publishing companies from royalties and profits on repeat sales of a particular recording.

SUMMARY OF THE INVENTION

The gist of the present invention is the use of highly sophisticated optic sound equipment to reduce sound patterns to micro-size so that they can be recorded and reproduced on film of micro size thereby making it extremely difficult for illegal reproductions and yet bring additional benefits to the person with playback equipment in the form of reduced storage problems for music libraries, and higher fidelity and longer lasting recordings.

A further advantage of the present invention is the ability to reproduce quantities of microfiche films inexpensively and quickly once the initial investment of the equipment is made.

Another feature of the present recording equipment is to help authors secure for the statutory limited time the exclusive right to their respective writings as guaranteed by Article 1 Section 8 of the Constitution.

Still another feature of the present invention is to provide a system which is compatible with presently existing recording equipment; is capable of reproducing variants in number of sound tracks on the microfiche and can utilize major components of existing equipment in the recording system.

A still further advantage is a system of recording sound on micorfiche through the use of photographic gradations of light reduced to micro-size.

Still another advantage is a recording system which will equal or surpass existing recording systems in fidelity, and produce recordings on a microfiche which can then be used in relatively inexpensive playback equipment which equals or exceeds high fidelity magnetic tape but at less cost.

BRIEF DESCRIPTION OF THE PREFERRED EMBODIMENTS OF THE INVENTION

Figure 1:
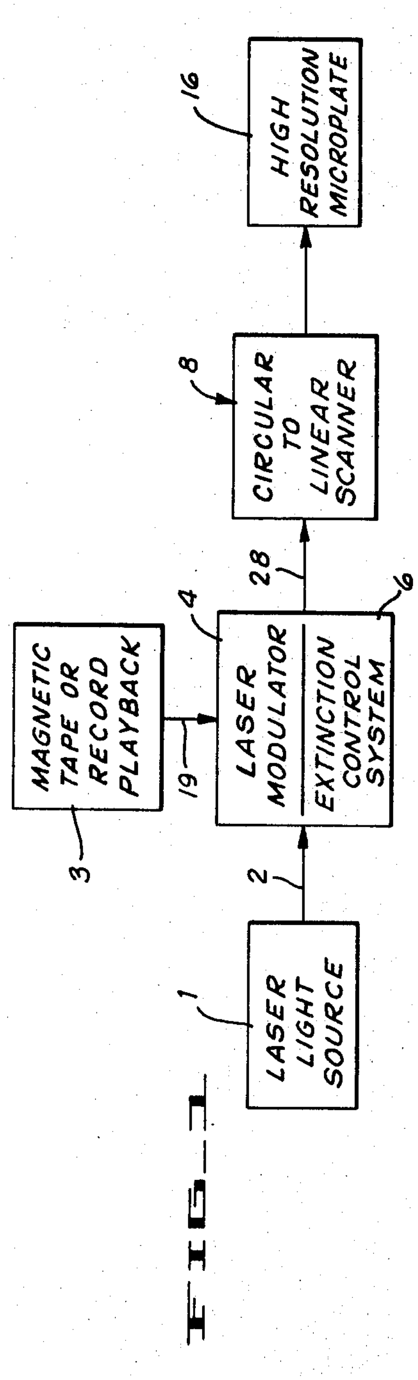
FIG. 1 is a schematic diagram of the system used for recording using the apparatus of the present invention.

The recording apparatus of the present invention consists briefly of means 1 for producing a beam 2 of coherent electromagnetic radiation; means 3 for producing a signal to be recorded; modulating means 4 receiving the beam of coherent electromagnetic radiation and the signal to be recorded and creating an optical image; extinction control means 6 operatively connected to the modulating means to prevent amplitude modulation drift, wherein the improvement comprises: a member 7 having a slit 5 therein for passing the modulated beam of coherent electromagnetic radiation therethrough; a plurality of optic fibers 8 arranged with their first ends 9 in a closed curvilinear line 11 and their second ends 12 in an open line pattern 13; optical means 14 mounted adjacent the slit for sequentially projecting the beam upon each of the first fiber optic ends; an elongated recording member 16 movably located adjacent the second ends of the fibers for receiving and retaining the image thereon; and means 17 for moving the recording member during the recording process.

The light source for creating the beam of coherent electromagnetic radiation is a monochromatic laser. A continuous emission gas laser such as a 100 milliwatt helium-neon gas laser is suitable.

The modulating means 4 changes the orientation of the plane of polarization of the light transmitted by the laser 1 through the polarizer 18 as a function of a modulating signal such as a signal 19 applied to the light modulator 4 from a source such as a magnetic tape or record playback 3.

Figure 7:
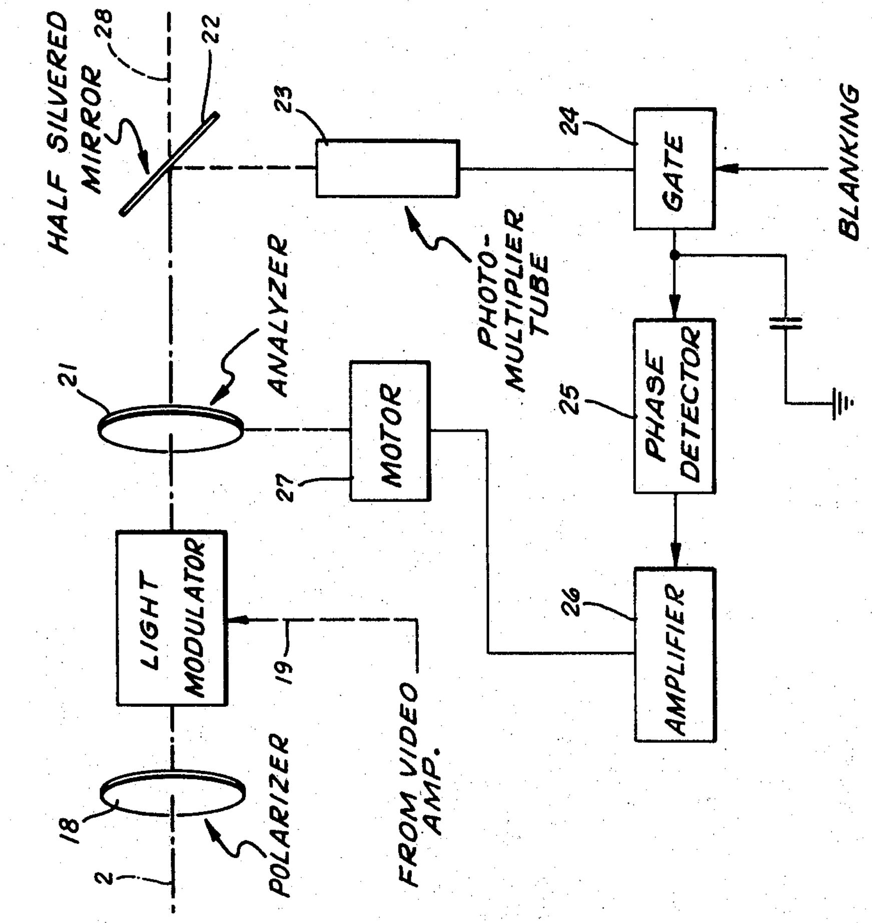
FIG. 7 is a diagram of an example of an extinction control system.

An extinction control system 6 is operatively connected to the light modulator. An example of an extinction control system is described in U.S. Pat. No. 3,562,422, the major parts of which are set forth in FIG. 7. Briefly, the system consists of an analyzer 21, a half silvered mirror 22, a photo-multiplier tube 23, a gate 24, a phase detector 25, an amplifier 26 and a motor 27.

Figures 3, 4, 8:
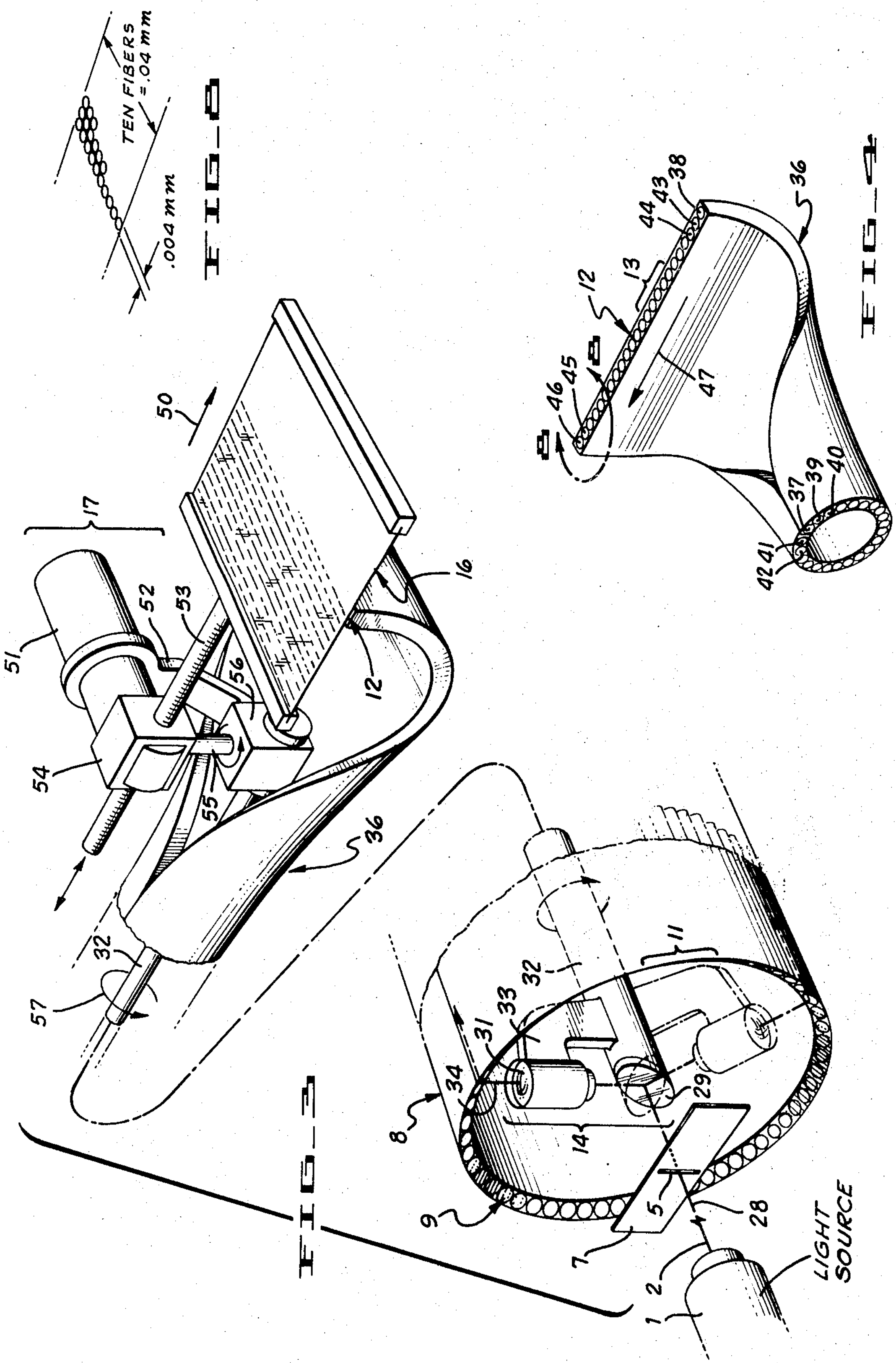
FIG. 3 is a perspective view of a portion of the apparatus of the present invention with a portion separated from the body of the main portion of the apparatus and rotated 90° to more clearly show the inner workings of the device. A dash-dot line indicates the proper assembly of the apparatus.
FIG. 4 is a perspective view of a portion of the device set forth in FIG. 3.
FIG. 8 is a greatly magnified portion of the optic fibers taken along line 8—8 of FIG. 4.

From the half silvered mirror, the modulated beam 28 passes through the slit 5 and is reflected from mirror 29 to lens 31. The mirror 29 may be formed on or connected to the end of a rotating shaft. It is to be understood that the optic means 14 could be a prism or any other means for changing the direction of the beam for entry into the optic fibers. As shown in FIG. 3, the mirror 29 is mounted at an angle so that the beam 28 is reflected at an angle into lens 31. The deflected beam is then focused into the ends of the optic fibers by a lens which reduces the image by 10 times or more. The lens may be connected directly to the shaft 32 by a bracket 33 for rotation therewith. The reflected and reduced modulated beam 34 is focused on the first ends 9 of the optic fibers. As shown in the drawings, the ends are polished flat faces angularly related to the initial longitudinal direction of the fibers. Where the initial longitudinal axis of the fibers is parallel to the axis 32, the end faces are formed at a 45 degree angle.

Figure 5:
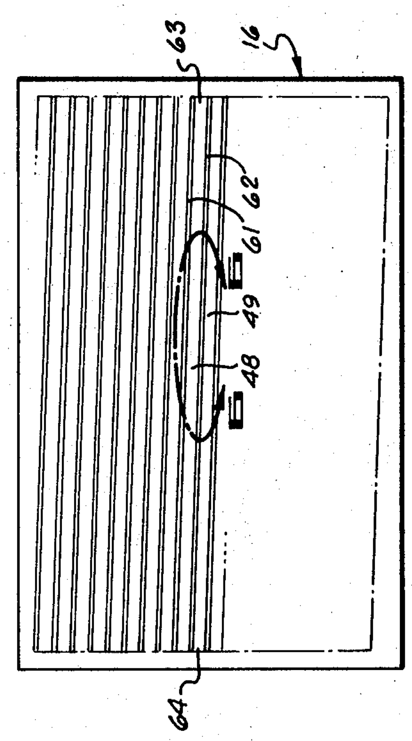
FIG. 5 is a plan view of a microfiche showing the format of the recording indicia thereon.
Figure 6:
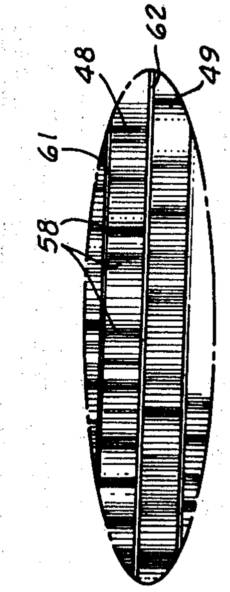
FIG. 6 is a greatly enlarged view of a portion of the microfiche shown substantially along the line 6—6 of FIG. 5.

The projected image of the slit is transferred by the coherent fiber optics characteristic of the circular to linear scanner shown generally in FIGS. 3 and 4 and designated by the number 8. The light enters fiber end 37 and emerges at fiber end 38. In like manner, the light enters ends 39, 40, travels around the entire circle, ending at 41 and 42 and emerges respectively at ends 43, 44 and across the line to ends 45 and 46. Thus the image of the slit is presented to the recording member 16 as a small light bar moving from right to left as indicated by arrow 47 at a speed directly proportional to the mirror rotation and with no return time. The instant the light disappears from end 46, it appears in end 38. FIG. 5 shows the recording member 16, hereafter referred to as a microplate. FIG. 6 shows a portion of the recorded image greatly magnified. Portions of two lines 48 and 49 are shown. The actual width of the recorded lines is purely a function of the size of the slit, the power of the microscope objective, the size of the optical fibers, and the resolution of the film, as it is the frequency resolution capability of the system.

The microplate 16 is constantly moved in the direction shown by arrow 50 by various mechanisms 17. As an example, an electric motor 51 mounted on bracket 52 turns threaded rod 53 by means of a worm gear box 54 which also is a right angle drive and rotates shaft 55 through right angle drive 56 which turns shaft 32 in the direction shown by arrow 57 which rotates the mirror 29 and lens 31. Thus the rotation of the mirror 29 is synchronized with the movement of the microplate 16.

Referring to FIG. 6, the image of the modulated beam appears on the microplate as a series of shaded lines 58 which are spaced at varying intervals. Each series of lines is separated by spaces such as are designated by the numbers 61 and 62.

The ability of the system to record on a flat surface as a series of lines without any interruption in the recording may be understood by reference also to FIGS. 3, 4 and 5. As the microplate moves slowly in the direction of the arrow 50, the bar of light moving in the direction of the arrow 47 across the end of the scanner causes a series of lines such as 48 and 49 to be formed at an angle to the sides of the microplate. Thus as the light ends at line end 63 of line 48, it reappears instantly at the line beginning 64 of line 49. The distance moved by the microplate is equal to twice the length of the slit image on the microplate indicated by number 58. This allows the next scanning to start immediately underneath the previous line.

The light patterns, reduced to micro photographic images, are recorded on high resolution film. As an example, the film should resolve about 1,000 lines per milimeter. Such resolution will produce sound recordings with low distortion factors and high fidelity characteristics, equal or superior to the state of recording art presently achieved through disc, or magnetic tape sound reproduction.

The microplate could be of any shape as long as the end of the scanner was shaped to a similar configuration. The simplest form and certainly the easiest from the standpoint of storage is to form the microfiche in a flat plane about 4 inches by 6 inches. Thus the second ends of the optic fibers are mounted in a plane substantially parallel to the recording surface of the recording member.

Upon completion of the recording, the microplate is developed and contact printed into high resolution microfilm sheets known as microfiche.

Figure 2:
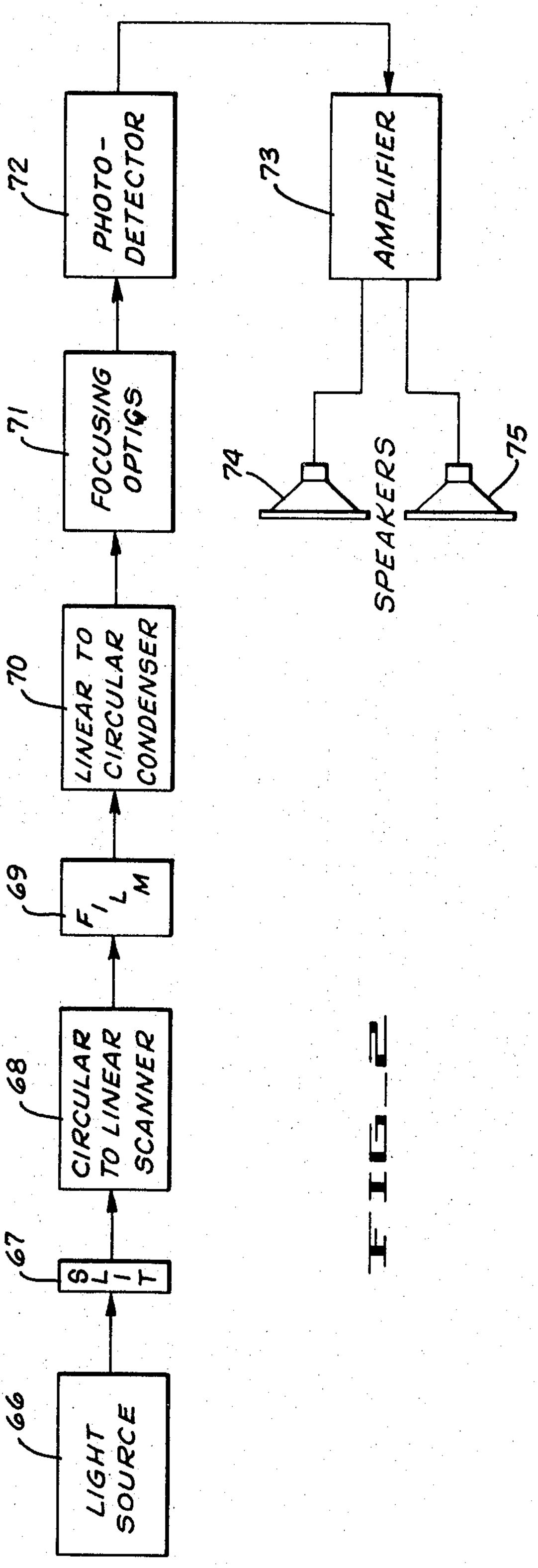
FIG. 2 is a schematic diagram of the apparatus used in the playback of the recordings made by the present equipment and described in my co-pending U.S. Pat. application Ser. No. 246,354 filed Apr. 21, 1972.

The playback apparatus is described in our U.S. Pat. application Ser. No. 246,354 filed concurrently herewith on Apr. 21, 1972. Briefly, the playback is shown in FIG. 2 and consists of a light source 66 which generates a beam of light which passes through a slit 67 which is projected onto a circular to linear scanner 68. The beam of light travels a bar of moving light across the microfiche 69. The light patterns from the film are transmitted by a linear to circular condenser 70 focused by optics 71 and picked up by a photo-detector 72 which activates an amplifier system 73. The sound emerges through speakers 74 and 75.

In order to be commercially practical, the playing time of the recording should be at least 30 minutes. This parameter is easily achieved by the microfiche format. If the line length is 6 inches, the slit width is 0.001 inches × 0.020 inches, the objective power is ten times and the fiber diameter is 0.0001 inches and the plate resolution is 500 lines per millimeter giving a line width of 0.00008 inches, the frequency modulation capability is 60,000 cycles per 6 inch line. Scanning at a rate of 60 lines per minute there is an equivalent frequency response of 60,000 cycles per second. The slit length of 0.020 inches has a capability of recording 2,000 lines in 4 inches which at a scanning frequency of one line per second represents a total recording time of 33 minutes.

The resolution requirements for the microfiche film may be calculated as follows: Assuming the size of the microfiche is to be 4 inches by 6 inches with the recording across the 6-inch dimension, and a maximum frequency of 30,000 cycles across the 6 inches and a playback time of 20 minutes at one line per second, the cycle width at 30,000 cycles is calculated as follows. The line width of 6 inches is divided by 30,000 cycles and this gives a cycle width of $2 \times 10^{-4}$ inches. The resolution requirements are therefore calculated by dividing 1 inch by the cycle width of $2 \times 10^{-4}$ and the conversion factor of 25.4 which equals 198 lines per millimeter. This is well within the resolution requirements of the microfiche film which at the present time is about 300 lines per millimeter.

The line width for a 20 minute playback, assuming that each line is scanned in 1 second, is calculated by dividing the 4-inch length of the card by 20 minutes × 60 seconds per minute, or a line width of $3.33 \times 10^{-3}$ inches. The resolution requirement of the line width is therefore calculated by dividing 1 inch by $3.33 \times 10^{-3} \times 25.4$ (the conversion factor) giving a resolution factor of 12 lines per millimeter.

The optical fiber size of $5.08 \times 10^{-4}$ millimeters is calculated, using the following assumptions: For a 3 percent distortion at 10,000 cycles, the slit width should be equivalent to one-thirtieth of the cycle width at that frequency. The cycle width at 10.000 cycles is calculated by dividing 6 by $1 \times 10^4$ giving a cycle width of $6 \times 10^{-4}$ inches. The slit width for a 3 percent distortion is therefore arrived at by dividing $6 \times 10^{-4}$ by $3 \times 10$ giving a slit width of $2 \times 10^{-5}$ inches. The size of the fiber is obtained by looking to the slit width. This is calculated by multiplying the slit width of $2 \times 10^{-5}$ by 25.4 (the conversion factor) giving a size of fiber of $5.08 \times 10^{-4}$ millimeters in diameter.

The film advancement speed is obtained from the previous calculations wherein the rate of scanning is to be one line per second with a line width for a 20-minute playback of $3.33 \times 10^{-3}$ inches. The advancement speed is therefore obtained by multiplying the line width of $3.33 \times 10^{-3}$ by 60 giving a speed of 0.1998 inches per minute.

The speed at which the mirror is turning is 60 revolutions per minute which is obtained by the assumption that the scanning time for each line is 1 second.

Referring to FIG. 8, which shows a greatly magnified portion of the ends of the fiber optics 8 in the circular to linear scanner, each of the individual fibers is about 0.004 millimeters in diameter closely spaced in rows which are 10 fibers wide for an end width of 0.04 millimeters.

We claim:

1. An apparatus for recording sound patterns consisting of:

a. means for producing a beam of coherent electromagnetic radiation;

b. means producing a signal to be recorded;

c. modulating means receiving said beam of coherent electromagnetic radiation and said signal to be recorded and creating an optical image;

d. extinction control means operatively connected to said modulating means to prevent amplitude modulation drift, wherein the improvement comprises:

1. a member having a slit therein for passing said modulated beam of coherent electromagnetic radiation therethrough;

2. a plurality of optic fibers arranged with their first ends in a closed curvilinear line and their second ends in an open line pattern;

3. optical means mounted adjacent said slit for sequentially projecting said beam upon each of said first fiber optic ends;

4. an elongatd recording member movably located adjacent the second ends of said fibers for receiving and retaining said image thereon; and

5. means moving said recording member during the recording process.

e. said optical means including a mirror mounted for rotation for receiving said modulated beam and sequentially reflecting said beam upon each of the first ends of said optic fibers;

f. said optical means including a rotatable shaft connected to said mirror;

g. a lens mounted on said shaft for rotation therewith for receiving said reflected beam from said mirror, and reducing, focusing and projecting said beam sequentially upon the first ends of said optic fibers;

h. said first ends of said optic fibers being arranged in substantially a circle and the ends of said optic fibers having planar faces in a plane angularly related to the longitudinal axis of said optic fibers;

i. said plane of said mirror being angularly related to the longitudinal axis of said shaft; and j. said means for moving said recording member being operatively connected to said shaft of said optical means for synchronizing the movements of said mirror, lens and recording member.

* * * * *